(12) United States Patent  
Weber et al.

(10) Patent No.: US 8,726,189 B2  
(45) Date of Patent: May 13, 2014

(54) MULTIPLE TAB STACK USER INTERFACE

(75) Inventors: Arnaud Claude Weber, Saratoga, CA (US); Roma Rajni Shah, San Francisco, CA (US); Alex Neely Ainslie, San Francisco, CA (US); Glen Murphy, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/314,128

(22) Filed: Dec. 7, 2011

(65) Prior Publication Data

US 2013/0152010 A1    Jun. 13, 2013

(51) Int. Cl.
*G06F 3/048* (2013.01)

(52) U.S. Cl.
USPC .......................................... 715/810

(58) Field of Classification Search
USPC .......................................... 715/810, 764, 783
See application file for complete search history.

(56) References Cited

U.S. PATENT DOCUMENTS

| | | | | |
|---|---|---|---|---|
| 5,694,561 | A * | 12/1997 | Malamud et al. | 715/805 |
| 6,108,714 | A * | 8/2000 | Kumagai et al. | 719/310 |
| 6,501,488 | B2 * | 12/2002 | Dvorak | 715/804 |
| 7,346,855 | B2 * | 3/2008 | Hellyar et al. | 715/783 |
| 7,370,284 | B2 * | 5/2008 | Andrea et al. | 715/788 |
| 7,478,326 | B2 * | 1/2009 | Holecek et al. | 715/716 |
| 7,581,192 | B2 * | 8/2009 | Stabb et al. | 715/781 |
| 2002/0047856 | A1 * | 4/2002 | Baker | 345/700 |
| 2002/0054052 | A1 * | 5/2002 | Sharma et al. | 345/700 |
| 2002/0083134 | A1 * | 6/2002 | Bauer et al. | 709/204 |
| 2006/0041846 | A1 * | 2/2006 | Masselle et al. | 715/793 |
| 2006/0224989 | A1 * | 10/2006 | Pettiross et al. | 715/779 |
| 2008/0215996 | A1 * | 9/2008 | Vega et al. | 715/760 |
| 2010/0153399 | A1 * | 6/2010 | Oliver et al. | 707/737 |
| 2010/0161587 | A1 * | 6/2010 | Sullivan | 707/709 |
| 2010/0179949 | A1 * | 7/2010 | Safar | 707/707 |
| 2011/0131523 | A1 * | 6/2011 | Grant et al. | 715/777 |

OTHER PUBLICATIONS

Paul, "Hands-on: Opera 11 tab stacking vs Firefox Panorama", Ars Technica, Nov. 24, 2010, retrieved from <http://arstechnica.com/information-technology/2010/11/hands-on-opera-11-tab-stacking-vs-firefox-panorama>.

"Opera Help: Advanced Preferences: Tabs", Jul. 11, 2011, retrieved from <http://web.archive.org/web/20110711123545/http://help.opera.com/Linux/11.00/en/tabs/html>.

Yang, "Firefox 4 Beta 4 Introduces Panorama to Group Tabs", Aug. 26, 2010, retrieved from <http://www.techairlines.com/2010/08/26/firefox-panorama-tab-management>.

"Private Tabs in a Web Browser", IP.com Journal, Mar. 5, 2009.

* cited by examiner

*Primary Examiner* — Amy Ng
*Assistant Examiner* — Erik Stitt
(74) *Attorney, Agent, or Firm* — McDermott Will & Emery LLP

(57) ABSTRACT

Computer-implemented methods for organizing graphical user interface windows into separate stacks of windows is provided are provided. In one aspect, a method includes providing, for display, a first window in a graphical user interface, and receiving a request to display a second window in the graphical user interface when viewing the first window. The method also includes moving the first window to a first stack in the graphical user interface in response to the request, and displaying the second window in the graphical user interface in a second stack. In response to a request to display a third window in the graphical user interface, the third window is configured to be displayed in the first stack or in the second stack based on a defined constraint shared between the third window and the second window. Systems, graphical user interfaces, and machine-readable media are also provided.

19 Claims, 6 Drawing Sheets

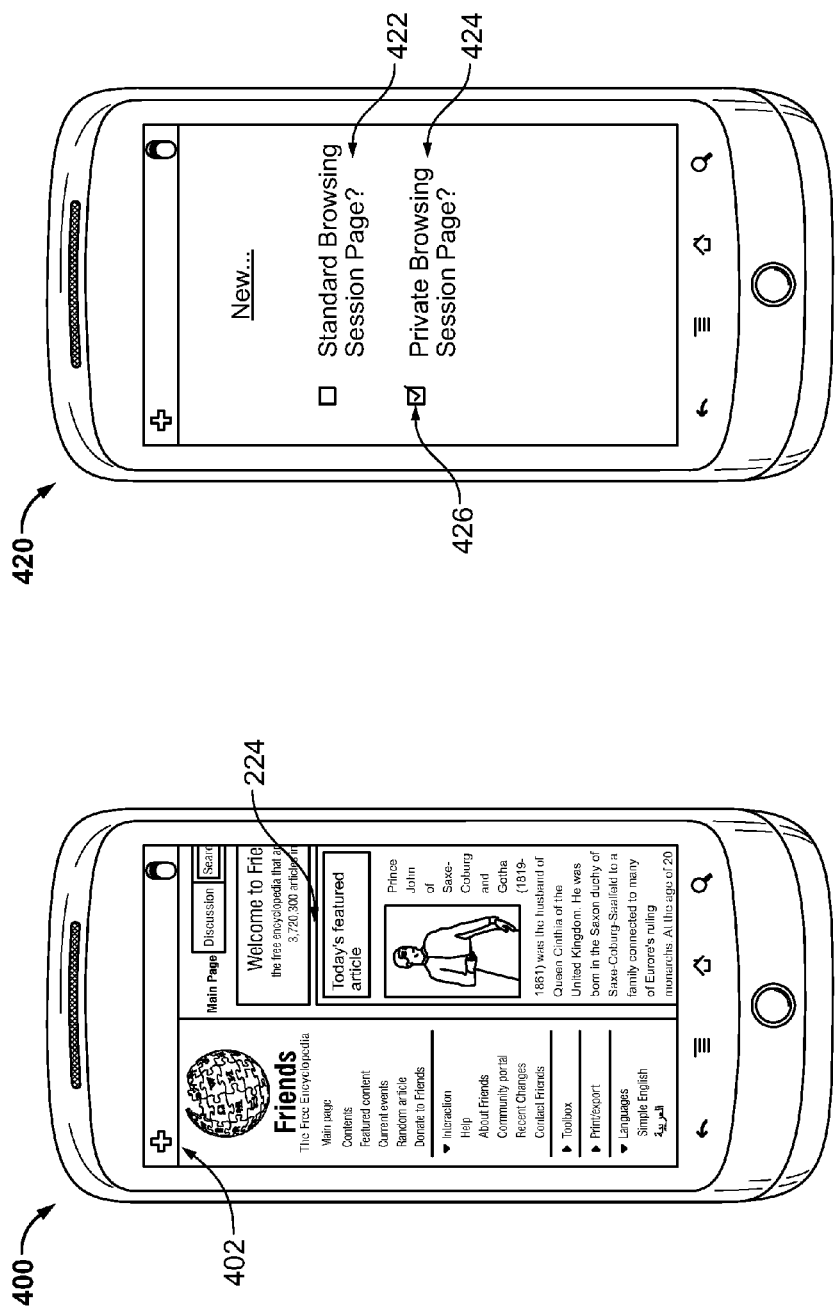

MULTIPLE TAB STACK USER INTERFACE

BACKGROUND

1. Field

The present disclosure generally relates to the transmission of data over a network, and more particularly to the use of a computing device to display information communicated over a network.

2. Description of the Related Art

Mobile device web browsers have limited screen space with which to display a single web page, let alone multiple web pages. Accordingly, certain mobile device web browsers use a tabbed document interface (TDI) to open multiple tabbed web page viewing windows within a web browser. When a user wants to select one of the tabbed windows ("tabs") to view, the tabs are displayed in a stack. Such stacking does not, however, assist the user with organizing the tabs. For example, the tab stack can include tabs for web pages that are logged into a certain profile, tabs for web pages that are not logged into the profile, tabs for web pages that are being tracked, and tabs for web pages that the user has asked not to be tracked. It is difficult for the user to ascertain where each type of web page is in the tab stack.

SUMMARY

According to one embodiment of the present disclosure, a computer-implemented method for organizing graphical user interface windows into separate stacks of windows is provided. The method includes providing, for display, a first window in a graphical user interface, and receiving a request to display a second window in the graphical user interface when viewing the first window. The method also includes moving the first window to a first stack in the graphical user interface in response to the request, and providing, for display, the second window in the graphical user interface in a second stack. In response to a request to display a third window in the graphical user interface, the third window is configured to be displayed in the first stack based on a defined constraint shared between the third window and the first window or in the second stack based on a defined constraint shared between the third window and the second window.

According to another embodiment of the present disclosure, a system for organizing graphical user interface windows into separate stacks of windows is provided. The system includes a memory includes instructions for displaying stacks of windows, and a processor. The processor is configured to execute the instructions to provide, for display, a first window in a graphical user interface, and receive a request to display a second window in the graphical user interface when viewing the first window. The processor is also configured to execute the instructions to move the first window to a first stack in the graphical user interface in response to the request, and provide, for display, the second window in the graphical user interface in a second stack. The first stack is created in response to the request to display the second window in the graphical user interface. In response to a request to display a third window in the graphical user interface, the third window is configured to be displayed in the first stack based on a defined constraint shared between the third window and the first window or in the second stack based on a defined constraint shared between the third window and the second window.

According to a further embodiment of the present disclosure, a user interface for organizing graphical user interface windows into separate stacks of windows is provided. The user interface includes a display interface configured to provide, for display, a first window in a graphical user interface, and a stacking interface configured to receive a request to display a second window in the graphical user interface when viewing the first window. In response to the request to display the second window when viewing the first window, the display interface is configured to move the first window to a first stack in the graphical user interface in response to the request and provide, for display, the second window in the graphical user interface in a second stack. In response to a request to display a third window in the graphical user interface, the display interface is configured to display the third window in the first stack based on a defined constraint shared between the third window and the first window or in the second stack based on a defined constraint shared between the third window and the second window.

According to yet a further embodiment of the present disclosure, a machine-readable storage medium includes machine-readable instructions for causing a processor to execute a method for organizing graphical user interface windows into separate stacks of windows is provided. The method includes providing, for display, a first web browsing window in a web browser, and receiving a request to display a second web browsing window in the web browser when viewing the first web browsing window. The method also includes moving the first web browsing window to a first stack in the web browser in response to the request, and providing, for display, the second web browsing window in the web browser in a second stack. In response to a request to display a third web browsing window in the web browser, the third web browsing window is configured to be displayed in the first stack or in the second stack based on a common defined constraint shared between the third web browsing window and the first stack or between the third web browsing window and the second stack.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings:

FIGS. 4A-4C are exemplary screenshots associated with the exemplary process of FIG. 3.

DETAILED DESCRIPTION

In the following detailed description, numerous specific details are set forth to provide a full understanding of the present disclosure. It will be apparent, however, to one ordinarily skilled in the art that the embodiments of the present disclosure may be practiced without some of these specific details. In other instances, well-known structures and techniques have not been shown in detail so as not to obscure the disclosure.

The disclosed graphical user interface provides for organizing windows into multiple stacks. Each stack of windows can be either manually created and organized by the user or automatically created and organized by the graphical user interface. The graphical user interface can be, for instance, a web browser. The graphical user interface can display multiple stacks of windows within the same interface.

For example, a user viewing web pages for an upcoming trip in a first stack of windows can manually create a second stack of windows for viewing web pages for an upcoming client meeting. As another example, if the web browser has a first stack of windows for web pages that are being tracked and the user selects to open a new web page browsing window for web browsing that is not to be tracked (e.g., a private browsing session), then a second stack of windows can automatically be created by the web browser for private browsing of web pages. The disclosed graphical user interface can be used on any type of device, but is especially useful for devices having limited screen space, such as smartphones. Although web browsing windows are used as examples, the disclosed approach of having multiple stacked windows can be used with any type of window.

Figure 1:
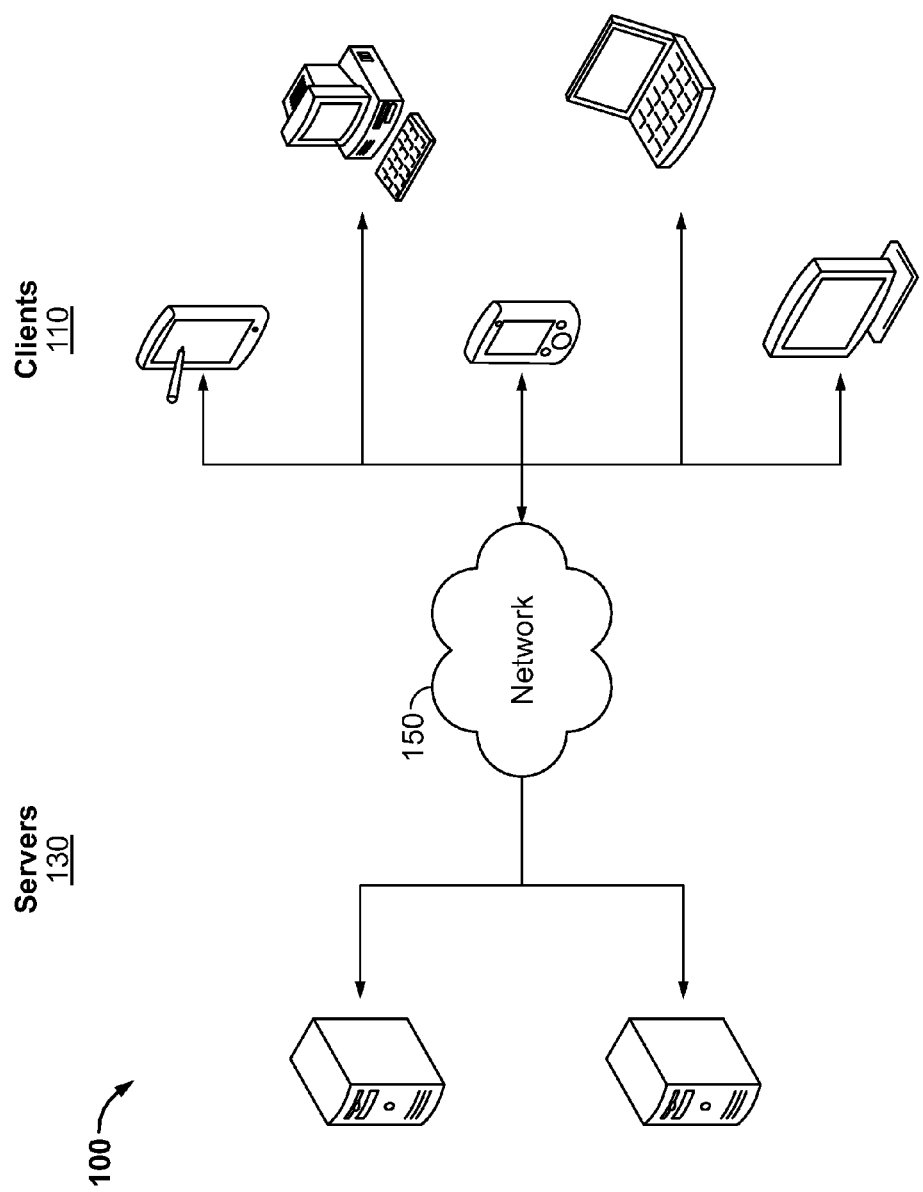
FIG. 1 illustrates an exemplary architecture for organizing graphical user interface windows into separate stacks of windows.

FIG. 1 illustrates an exemplary architecture 100 for organizing graphical user interface windows into separate stacks of windows. The architecture 100 includes servers 130 and clients 110 connected over a network 150.

The architecture 100 includes clients 110 connected to servers 130 over a network 150. The clients 110 can be, for example, desktop computers, mobile computers, tablet computers, mobile devices (e.g., a smartphone or PDA), set top boxes (e.g., for a television), video game consoles, or any other devices having appropriate processor, communications capabilities, and memory. Each client 110 is configured to include a graphical user interface that organizes windows into separate stacks. When a user is using the graphical user interface, the windows within the graphical user interface are organized into stacks based on a common defined constraint. The common defined constraint can be, for example, a user-defined constraint or an application-defined constraint. Exemplary application defined constraints include a user account, a data storage location associated with the content displayed in a window, or identifiers associated with the content. Exemplary user-defined constraints include work windows, personal windows, task windows, etc. For example, if the graphical user interface is a web browser, then a first stack of windows can have a common application-defined constraint of being for a private (or "incognito") viewing mode, while a second stack of windows can have a common defined constraint of not being for the private viewing mode. Multiple stacks of windows can be displayed within the same graphical user interface.

The clients 110 can be connected to the network 150. The network 150 can include any one or more of a personal area network (PAN), a local area network (LAN), a campus area network (CAN), a metropolitan area network (MAN), a wide area network (WAN), a broadband network (BBN), the Internet, and the like. Further, the network 150 can include, but is not limited to, any one or more of the following network topologies, including a bus network, a star network, a ring network, a mesh network, a star-bus network, tree or hierarchical network, and the like.

The graphical user interface can be downloaded over the network 150 from one of the many servers 130. For purposes of load balancing, multiple servers 130 can also host the data for downloading the graphical user interface. In certain instances, different versions and/or configurations of the graphical user interface that include the features disclosed herein are available for download from a server 130 and subsequent installation depending on whether the client 130 is a mobile device or non-mobile device.

Figure 2:
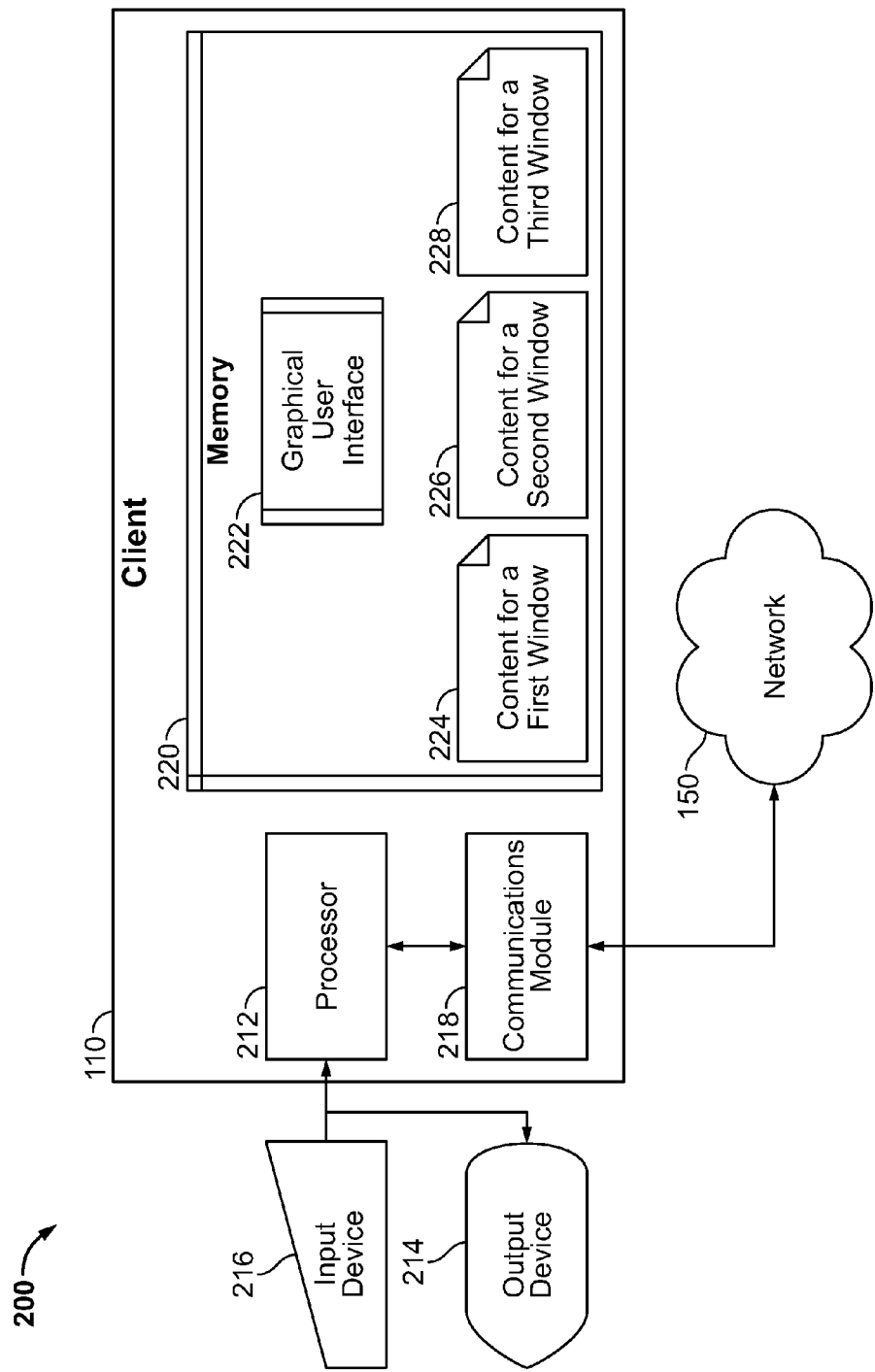
FIG. 2 is a block diagram illustrating an exemplary client from the architecture of FIG. 1 according to certain aspects of the disclosure.

FIG. 2 is a block diagram 200 illustrating an exemplary client 110 in the architecture 100 of FIG. 1 according to certain aspects of the disclosure. The client 110 is connected to the network 150 via a communications module 218. The communications module 218 is configured to interface with the network 150 to send and receive information, such as data, requests, responses, and commands to other devices on the network. The communications module 218 can be, for example, a modem or Ethernet card.

The client 110 includes a processor 212, the communications module 218, and a memory 220. The memory 220 includes a graphical user interface 222 and content for a first window 224, content for a second window 226, and content for a third window 228. The client 110 also includes an input device 216, such as a keyboard, touchscreen, or mouse, to receive user input to the graphical user interface 222 and an output device 214 to display the graphical user interface 222. The graphical user interface 222 can be, for example, a web browser or a document viewer. When the graphical user interface 222 is a web browser, then the content for the windows 224, 226, or 228 can be, for example, a web page (e.g., a previously viewed or loaded web page) or new web page browsing information (a "new tab" page). When the graphical user interface 222 is a document viewer, then the content for the windows 224, 226, or 228 can be, for example, documents (e.g., a previously created and loaded document or a newly created document), such as text, images, or displayed audio.

The processor 212 of the client 110 is configured to execute instructions, such as instructions physically coded into the processor 212, instructions received from software in memory 240, or a combination of both. For example, the processor 212 of the client 110 executes instructions from the graphical user interface 222 to provide, for display (e.g., on output device 214), a first window (e.g., displaying the content for the first window 224) in the graphical user interface 222, and receive a request to display a second window in the graphical user interface 222 when viewing the first window. When the graphical user interface 222 is a document viewer, then the windows can be, for example, document viewing windows. When the graphical user interface 222 is a web browser, then the windows can be, for example, web browsing windows/tabs.

The processor 212 is also configured to move the first window to a first stack in the graphical user interface 222 in response to the request, and display the second window (e.g., which displays the content for the second window 226) in the graphical user interface 222 in a second stack. Both the first stack of windows and the second stack of windows can each include other windows, and each of the windows in either the first stack or the second stack can share a common defined constraint with other windows in the same stack, such as application-defined constraints and user-defined constraints. Exemplary application-defined constraints include, for example, a user account common to each of the windows, a data storage location associated with the content displayed in each of the windows, or common identifiers associated with the content displayed in each of the windows satisfied by each of the windows. When the graphical user interface 222 is a web browser, a defined constraint common to tabs in the same stack can be that each of the tabs represents in a single stack are in a private web browsing session mode, display web pages logged in using a same user profile, or display web pages from a same domain address. Additionally, the first stack can be created for display in response to the request to display the second window in the graphical user interface 222, where, for example, any windows displayed in the first stack were not considered part of a same stack before the request to display the second window was received.

In response to a request to display a third window in the graphical user interface 222, the processor 212 is further configured to display the third window (e.g., displaying the content for the third window 228) in the first stack or in the second stack. Either the first stack or the second stack can be chosen for the third window based on a common defined constraint (e.g., non-private web browsing session mode) between the third window and the first stack, or a common defined constraint (e.g., private web browsing session mode) between the third window and the second stack. The third window can be displayed in the second stack (or any other stack) by, for example, overlaying at least a portion of the third window above the second window (e.g., like a partially outspread stack of cards), or by displaying the third window in the second stack vertically above the second window (e.g., like an un-spread, uniform stack of cards). Other graphic representations known to those of ordinary skill in the art can also be used to display stacked windows.

Figure 3:
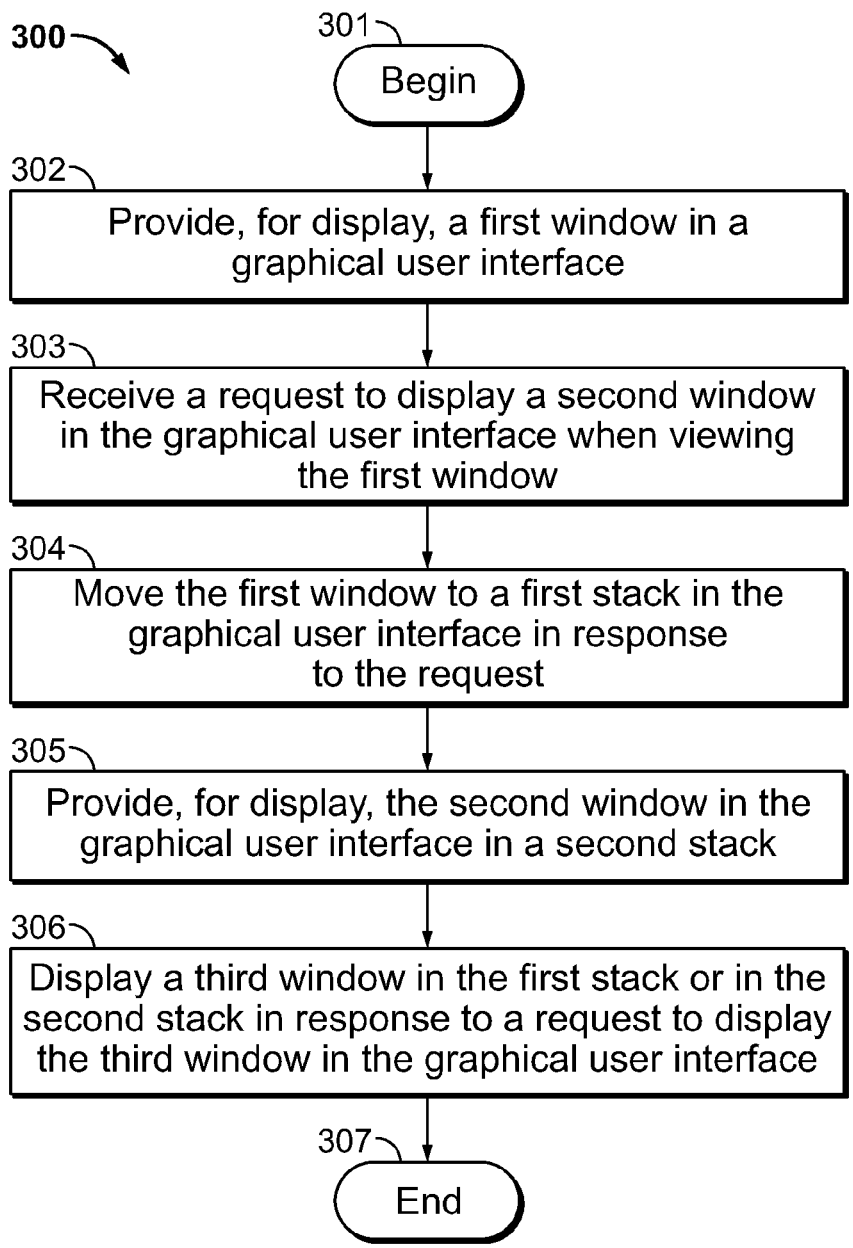
FIG. 3 illustrates an exemplary process for organizing graphical user interface windows into separate stacks of windows using an exemplary client of FIG. 2.

FIG. 3 illustrates an exemplary process 300 for organizing graphical user interface windows into separate stacks of windows using the exemplary client 110 of FIG. 2. The process 300 begins by proceeding from step 301 when a graphical user interface 222 is loaded on the client 110 to step 302 when a first window is provided for display (e.g., by the processor 212) in the graphical user interface 302. In step 303, a request is received to display a second window in the graphical user interface 222 when viewing the first window, and in step 304 the first window is moved to a first stack in the graphical user interface 222 in response to the request. In step 305, the second window is provided for display in the graphical user interface 222 in a second stack, and in step 306, a third window is displayed in the first stack or in the second stack in response to a request to display the third window in the graphical user interface 222. Either the first stack or the second stack can be chosen for the third window based on a common defined constraint between the third window and the first stack, or a common defined constraint between the third window and the second stack. The process 300 then ends.

FIG. 3 sets forth an exemplary process 300 for organizing graphical user interface windows into separate stacks of windows using the exemplary client 110 of FIG. 2. An example will now be described using the exemplary process 300 of FIG. 3, a web browser as the graphical user interface 222, and a smartphone as the client 110.

Figure 4C:
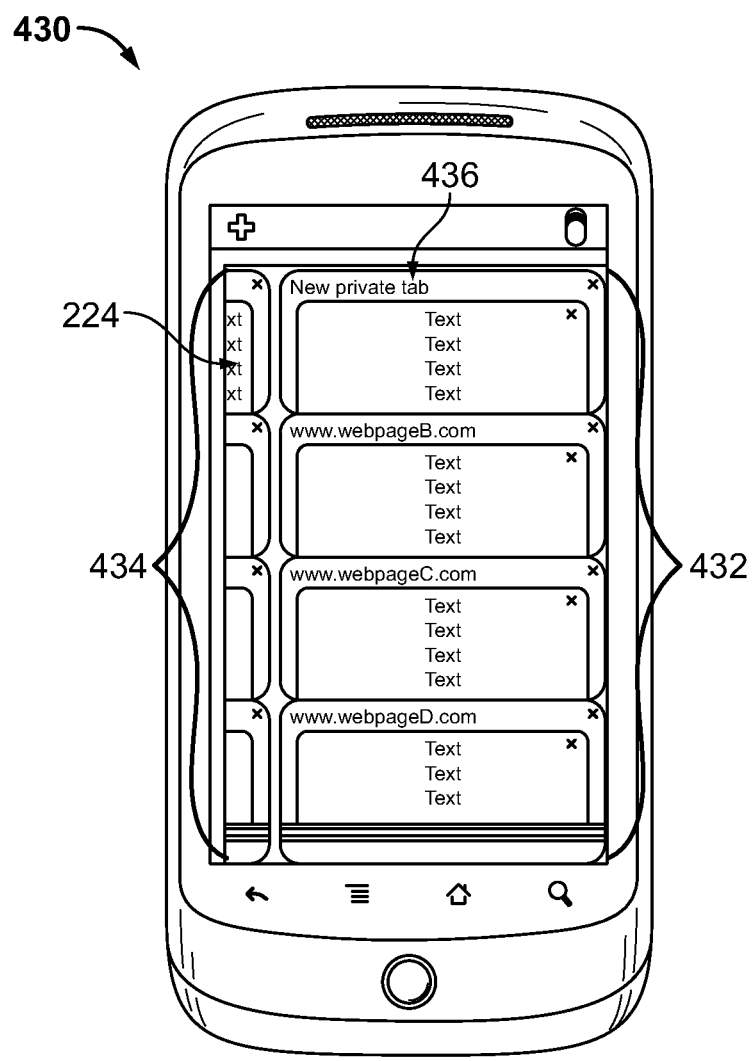

The process 300 begins by proceeding from step 301 when a user loads a web browser 222 on the user's smartphone 110 to step 302 when a web page 224 is provided in a first tab in the web browser 222. FIG. 4A is an exemplary screenshot 400 of the web page 224 in the first tab. In step 303, while viewing the first tab, the user submits a request to display a second tab in the web browser 222. Specifically, the user presses the "+" button 402 within a display interface of the web browser 402 to create a new tab page, and in response the web browser 222 queries the user to select what type of new tab page the user would like to create, as illustrated in FIG. 4B. FIG. 4B is an exemplary screenshot 420 of a query to a user to select the type (e.g., constraint) of the second tab the user requests to display in the web browser 222. The query includes an option to the user to choose an application-defined constraint of a standard browsing session tab 422 or a defined constraint of a private browsing session tab 424, of which the latter is selected 426 by the user. As illustrated in FIG. 4C, an exemplary screenshot 430 of tab stacks, in step 304 the first tab that includes the web page 224 is moved by a stacking interface to a first stack 434 of other previously open tabs in the web browser 222 in response to the request. The web browser 222 displays multiple tab stacks 434 and 432 within the same window. In step 305, the second tab 436 (e.g., for the private browsing session) is provided for display in the web browser 222 by the stacking interface in a second stack 432 of other private browsing tabs. As illustrated, the tabs in each stack 434 and 432 are displayed by overlaying a portion of the tab in the stack above the tab that is below it (e.g., like a partially outspread stack of cards). When the user requests to display a third tab, namely another tab for private browsing, then in step 306 the third tab is displayed in the second stack 432 in the web browser 222 because the third tab and the tabs in the second stack 432 each share the common application-defined constraint of being for private browsing. The process 300 then ends.

Figure 5:
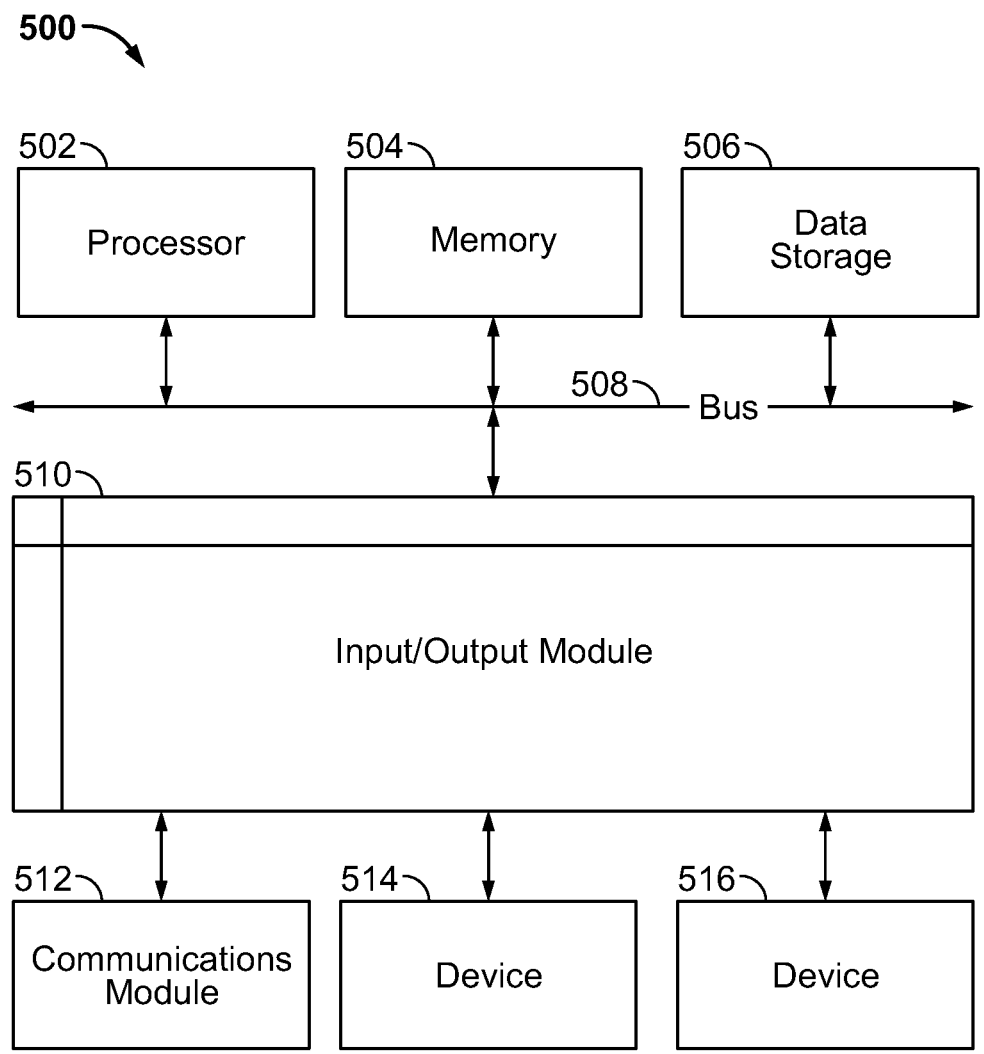
FIG. 5 is a block diagram illustrating an exemplary computer system with which the client of FIG. 2 can be implemented.

FIG. 5 is a block diagram illustrating an exemplary computer system 500 with which the client 110 of FIG. 2 can be implemented. In certain aspects, the computer system 500 may be implemented using hardware or a combination of software and hardware, either in a dedicated server, or integrated into another entity, or distributed across multiple entities.

Computer system 500 (e.g., client 110) includes a bus 508 or other communication mechanism for communicating information, and a processor 502 (e.g., processor 212) coupled with bus 508 for processing information. By way of example, the computer system 500 may be implemented with one or more processors 502. Processor 502 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 500 can include, in addition to hardware, code that creates an execution environment for the computer program in question, e.g., code that constitutes processor firmware, a protocol stack, a database management system, an operating system, or a combination of one or more of them stored in an included memory 504 (e.g., memory 220), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 508 for storing information and instructions to be executed by processor 502. The processor 502 and the memory 504 can be supplemented by, or incorporated in, special purpose logic circuitry.

The instructions may be stored in the memory 504 and implemented in one or more computer program products, i.e., one or more modules of computer program instructions encoded on a computer readable medium for execution by, or to control the operation of, the computer system 500, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, embeddable languages, and xml-based languages. Memory 504 may also be used for storing temporary variable or other intermediate information during execution of instructions to be executed by processor 502.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 500 further includes a data storage device 506 such as a magnetic disk or optical disk, coupled to bus 508 for storing information and instructions. Computer system 500 may be coupled via input/output module 510 to various devices. The input/output module 510 can be any input/output module. Exemplary input/output modules 510 include data ports such as USB ports. The input/output module 510 is configured to connect to a communications module 512. Exemplary communications modules 512 (e.g., communications module 218) include networking interface cards, such as Ethernet cards and modems. In certain aspects, the input/output module 510 is configured to connect to a plurality of devices, such as an input device 514 (e.g., input device 216) and/or an output device 516 (e.g., output device 214). Exemplary input devices 514 include a keyboard and a pointing device, e.g., a mouse or a trackball, by which a user can provide input to the computer system 500. Other kinds of input devices 514 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Exemplary output devices 516 include display devices, such as a CRT (cathode ray tube) or LCD (liquid crystal display) monitor, for displaying information to the user.

According to one aspect of the present disclosure, the client 110 can be implemented using a computer system 500 in response to processor 502 executing one or more sequences of one or more instructions contained in memory 504. Such instructions may be read into memory 504 from another machine-readable medium, such as data storage device 506. Execution of the sequences of instructions contained in main memory 504 causes processor 502 to perform the process steps described herein. One or more processors in a multi-processing arrangement may also be employed to execute the sequences of instructions contained in memory 504. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network (e.g., network 150) can include, for example, any one or more of a personal area network (PAN), a local area network (LAN), a campus area network (CAN), a metropolitan area network (MAN), a wide area network (WAN), a broadband network (BBN), the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computing system 500 can include clients and servers. A client and server are generally remote from each other and typically interact through a communication network. The relationship of client and server arises by virtue of computer programs running on the respective computers and having a client-server relationship to each other. Computer system 500 can be, for example, and without limitation, a desktop computer, laptop computer, or tablet computer. Computer system 500 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer readable medium" as used herein refers to any medium or media that participates in providing instructions to processor 502 for execution. Such a medium may take many forms, including, but not limited to, non-volatile media, volatile media, and transmission media. Non-volatile media include, for example, optical or magnetic disks, such as data storage device 506. Volatile media include dynamic memory, such as memory 504. Transmission media include coaxial cables, copper wire, and fiber optics, including the wires that comprise bus 508. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The subject matter of this specification has been described in terms of particular aspects, but other aspects can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

These and other implementations are within the scope of the following claims.

What is claimed is:

1. A computer-implemented method for organizing graphical user interface windows into separate stacks of windows, the method comprising:
   providing, for display, a first window in a graphical user interface of a web browser application, the web browser application comprising at least two defined constraints for distinguishing stacks of windows;
   receiving a request to open a second window in the graphical user interface when viewing the first window;
   determining, in response to the request to open the second window and before displaying the second window, to move the first window to a first stack of web browsing windows;
   moving the first window to the first stack in the graphical user interface based on the determination; and
   providing, for display, the second window in the graphical user interface in a second stack of web browsing windows,
   wherein, in response to a request to display a third window in the graphical user interface, the third window is provided for display in the first stack based on a defined constraint, from among the at least two defined constraints of the web browser application, shared between the third window and the first window or in the second stack based on a defined constraint, from among the at least two defined constraints of the web browser application, shared between the third window and the second window,
   wherein the request to display the third window comprises an identification of the defined constraint shared between the third window and the first window or of the defined constraint shared between the third window and the second window, and
   wherein the defined constraint of the first window comprises a non-private web browsing session mode, and the defined constraint of the second window comprises a private web browsing session mode.

2. The computer-implemented method of claim 1, wherein each of the windows in the first stack share a common user-defined constraint and each of the windows in the second stack share another common user-defined constraint.

3. The computer-implemented method of claim 1, wherein each of the windows is a web page viewing window.

4. The computer-implemented method of claim 3, wherein at least one of the shared defined constraints is a user profile, a domain address, or a user-defined constraint.

5. The computer-implemented method of claim 1, wherein the display of the third window in the second stack comprises overlaying at least a portion of the third window above the second window.

6. The computer-implemented method of claim 1, wherein the display of the third window in the second stack comprises displaying the third window vertically above the second window.

7. The computer-implemented method of claim 1, wherein the first stack comprises other windows.

8. The computer-implemented method of claim 1, wherein the first stack is created in response to the request to display the second window in the graphical user interface.

9. The computer-implemented method of claim 1, wherein the user interface is a document viewer, and each of the windows is a document viewing window.

10. A system for organizing graphical user interface windows into separate stacks of windows, the system comprising:
   a memory comprising instructions for displaying stacks of windows; and
   a processor configured to execute the instructions to:
      provide, for display, a first window in a graphical user interface of a web browser application, the web browser application comprising at least two defined constraints for distinguishing stacks of windows;
      receive a request to open a second window in the graphical user interface when viewing the first window;
      determine, in response to the request to open the second window and before displaying the second window, to move the first window to a first stack for web browsing windows;
      move the first window to the first stack in the graphical user interface based on the determination; and
      provide, for display, the second window in the graphical user interface in the second stack,
      wherein the first stack is created in response to the request to display the second window in the graphical user interface,
      wherein, in response to a request to display a third window in the graphical user interface, the third window is configured to be displayed in the first stack based on a defined constraint, from among the at least two defined constraints of the web browser application, shared between the third window and the first window or in the second stack based on a defined constraint, from among the at least two defined constraints of the web browser application, shared between the third window and the second window, wherein the request to display the third window comprises an identification of the defined constraint shared between the third window and the first window or of the defined constraint shared between the third window and the second window, and wherein the defined constraint of the first window comprises a non-private web browsing session mode, and the defined constraint of the second window comprises a private web browsing session mode.

11. The system of claim 10, wherein the first stack comprises other windows.

12. The system of claim 10, wherein each of the windows in the first stack share a common user-defined constraint and each of the windows in the second stack share another common user-defined constraint.

13. The system of claim 10, wherein each of the windows is a web page viewing window.

14. The system of claim 10, wherein at least one of the shared defined constraints is a user profile, a domain address, or a user-defined constraint.

15. The system of claim 10, wherein the display of the third window in the second stack comprises overlaying at least a portion of the third window above the second window.

16. The system of claim 10, wherein the display of the third window in the second stack comprises displaying the third window vertically above the second window.

17. The system of claim 10, wherein the user interface is a document viewer, and each of the windows is a document viewing window.

18. A user interface for organizing graphical user interface windows into separate stacks of windows, the user interface comprising:
    a display device;
    a display interface configured to provide, for display on the display device, a first window in a graphical user interface of a web browser application, the web browser application comprising at least two defined constraints for distinguishing stacks of windows; and
    a stacking interface configured to receive a request to open a second window in the graphical user interface when viewing the first window,
    wherein, in response to the request to open the second window when viewing the first window, the display interface is configured to determine, in response to the request to open the second window and before displaying the second window, to move the first window to a first stack for web browsing windows, move the first window to the first stack in the graphical user interface based on the determination, and provide, for display, the second window in the graphical user interface in the second stack,
    wherein, in response to a request to display a third window in the graphical user interface, the display interface is configured to display, using a processor, the third window in the first stack based on a defined constraint, from among the at least two defined constraints of the web browser application, shared between the third window and the first window or in the second stack based on a defined constraint, from among the at least two defined constraints of the web browser application, shared between the third window and the second window,
    wherein the request to display a third window comprises an identification of the defined constraint shared between the third window and the first window or of the defined constraint shared between the third window and the second window, and
    wherein the defined constraint of the first window comprises a non-private web browsing session mode, and the defined constraint of the second window comprises a private web browsing session mode.

19. A non-transitory machine-readable storage medium comprising machine-readable instructions for causing a processor to execute a method for organizing graphical user interface windows into separate stacks of windows, the method comprising:
    providing, for display, a first web browsing window in a web browser application comprising at least two defined constraints for distinguishing stacks of windows;
    receiving a request to open a second web browsing window in the web browser application when viewing the first web browsing window;
    determining, in response to the request to open the second web browsing window and before displaying the second web browsing window, to move the first web browsing window to a first stack for web browsing windows;
    moving the first web browsing window to the first stack in the web browser application based on the determination; and
    providing, for display, the second web browsing window in the web browser application in the second stack,
    wherein, in response to a request to display a third web browsing window in the web browser, the third web browsing window is configured to be displayed in the first stack or in the second stack based on a common defined constraint, from among the at least two defined constraints of the web browser application, shared between the third web browsing window and the first stack or between the third web browsing window and the second stack,
    wherein the request to display a third window comprises an identification of the defined constraint shared between the third window and the first stack or of the defined constraint shared between the third window and the second stack, and
    wherein the defined constraint of the first window comprises a non-private web browsing session mode, and the defined constraint of the second window comprises a private web browsing session mode.

* * * * *